United States Patent Office 2,832,764
Patented Apr. 29, 1958

2,832,764

PRODUCTION OF AZO DYESTUFFS

Siegfried Huenig, Marburg (Lahn), Germany, assignor to Badische Anilin- & Soda-Fabrik Aktiengesellschaft, Ludwigshafen (Rhine), Germany No Drawing. Application March 20, 1956
Serial No. 572,839

Claims priority, application Germany March 31, 1955

3 Claims. (Cl. 260—158)

This invention relates to a new and advantageous process for the production of azo dyestuffs as well as some new azo dyestuffs which are obtainable according to the said process.

It relates in particular to azo dyestuffs in which the azo group is connected on one side with a heterocyclic basic radical and on the other side with the radical of an azo component, as for example of a naphthol, arylamine or enol radical, and a new and simple method for their production.

The process according to this invention consists in subjecting to the action of oxidizing or dehydrogenating agents a mixture of about equivalent amounts of an organic compound having a reactive hydrogen atom capable of being azo-coupled, and of a heterocyclic hydrazone or hydrazino compound of the tautomeric formulae

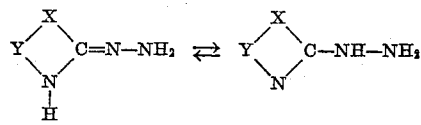

in which X represents a divalent bridge, such as —O—, —S— and —CR$_2$— bridges (R being methyl or ethyl), and Y represents a ethylene, alkyl or aryl substituted ethylene, o-phenylene or o-naphthylene radical which may contain alkyl, alkoxy, nitro, cyano, halogeno, amino, acylamino, carboxylic or sulfonic acid groups.

Suitable hydrazones or hydrazino compounds of the above formulae are for example benzthiazolone hydrazone (or 2-hydrazinobenzthiazole), benzoxazolone hydrazone (or 2-hydrazinobenzoxazole), 2-hydrazino-3.3-dimethylindolenine, 2-hydrazino-6-nitrobenzthiazole, 2-hydrazino-6-aminobenzthiazole, 2-hydrazino-6-acetyl- or benzoylaminobenzthiazole, 2-hydrazinothiazole, 4.5-dimethyl- and 4.5-diphenyl-2-hydrazinothiazole, 4-phenyl- or 4-paratolyl-2-hydrazinothiazole, 2-hydrazino-5.6- or -4.5-naphthothiazole, 2-hydrazino-7-chlor- or -7-cyanobenzthiazole, 2-hydrazino-5-bromobenzthiazole, 2-hydrazino-5-, -6- or -7-methoxybenzthiazole, 2-hydrazinobenzoxazole-5-sulfonic acid or -5-carboxylic acid. Such hydrazones or the hydrazino compounds tautomeric therewith are obtainable for example by the methods described in U. S. patent specification No. 2,659,730, in German patent specification No. 614,327 or in the Journal of the American Chemical Society 73 (1951), page 4010.

Such heterocyclic hydrazones or hydrazino compounds are reacted according to the present invention in the presence of dehydrogenating or oxidizing agents with organic compounds which contain reactive hydrogen atoms capable of being azo-coupled. Principally all compounds capable of being coupled with diazonium salts to azo dyestuffs are suitable, thus for example phenols and naphthols; aromatic amines, such as aniline, dimethyl- or diethyl-aniline, N-alkyl-N-hydroxy-, chloro- or cyanoethyl-anilines, N-benzylaniline, diphenylamine, N-alkyl-p-alkoxy diphenylamines, the toluidines, anisidines; aminophenols and aminonaphthols; 8-hydroxyquinoline; enols, such as acetylacetone, acetoacetic acid ester, dibenzoylmethane, dihydroresorcinol, dimedone, barbituric acids, pyrazolones, rhodanines; malodinitrile; N-methyl-2-phenylindole or 1.2-dimethylindole.

When 2-hydrazinobenzthiazole and dimethylaniline are used as initial materials, the reaction may be formulated as follows:

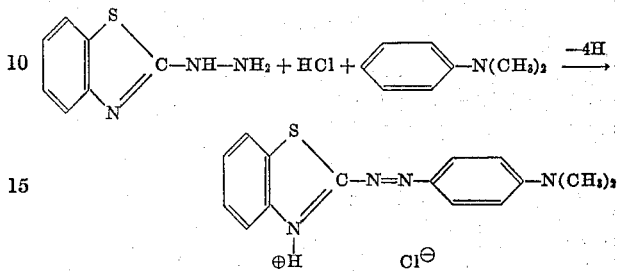

In this reaction, when carried out in the presence of hydrochloric acid, the hydrochloride of a basic azo dyestuff is formed from which the latter can be liberated by conventional methods, for example by the addition of caustic alkalies, potassium carbonate or sodium acetate in the required amount.

When 2-hydrazinobenzthiazole and α-naphthol are used as initial materials a hydroxyazo dyestuff having the following formula is obtained:

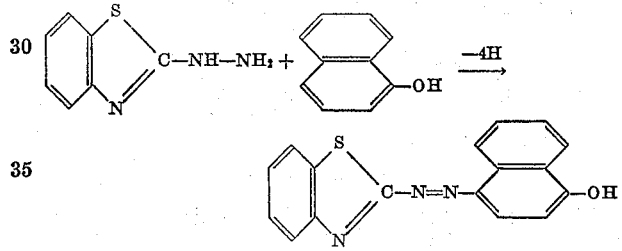

As dehydrogenating or oxidizing agents there are suitable for example potassium or sodium ferricyanide and other ferric salts, cupric salts, mercuric salts, ceric salts, hypochlorites, lead dioxide, persulfates, perborates, hydrogen peroxide and elementary oxygen, as for example air, and other inorganic water soluble oxidizing agents, in particular in the presence of oxygen-transferers, such as ferric salts.

The formation of the dyestuff, which may be described as an oxidative coupling, can be carried out in acid, neutral or alkaline medium depending on the nature of the components and of the oxidizing agent. When using amines as coupling components it is preferable to work in acid medium, and when using naphthols in a neutral or alkaline medium, as for example an ammoniacal medium. The most favorable conditions in each case can be readily ascertained by preliminary experiment. The yields of dyestuff are in most cases very good.

Azo dyestuffs which contain a benzthiazole radical on one side of the azo group can also be prepared, as already known, by diazotizing 2-aminobenzthiazole and coupling the resultant diazonium compound with naphthols, amines or enols. The diazotisation and coupling of 2-aminobenzthiazole is, however, only possible under extreme conditions and often gives unsatisfactory yields of azo dyestuffs by reason of the instability of the diazonium salt. The present invention not only has the advantage that it is more easily carried out technically in the case of the benzthiazole derivative and gives better yields, but also that it can be successfully employed in many other cases where the corresponding diazonium salt cannot be prepared or where it cannot be used for coupling by reason of its instability.

The dyestuffs can also be produced on the fibre by applying a hydrazone or a hydrazino compound of the above-mentioned kind and a coupling component to the same and then allowing the dehydrogenating or oxidizing agent to act thereon.

The azo dyestuffs obtainable by the present process may be used as such as pigments or for dyeing wool, silk and cellulose acetate. They can be quaternized, for example by means of methyl- or ethylchloride, -bromide or -iodide, or by means of benzylhalides, dimethylsulfate or toluene sulfonic acid alkyl esters; the quaternized dyestuffs being outstandingly valuable for dyeing fibres consisting of polyacrylonitrile or copolymers containing acrylonitrile giving brilliant shades of excellent fastness to light.

The following examples will further illustrate this invention but the invention is not restricted to these examples. The parts specified are parts by weight.

*Example 1*

16.5 parts of 2-hydrazinobenzthiazole (or benzthiazolone hydrazone) and 15 parts of α-naphthol are dissolved in 500 parts of methanol while heating, then 250 parts of water and 50 parts of concentrated aqueous ammonia solution are introduced and a solution of 150 parts of potassium ferricyanide in 500 parts of water are allowed to flow in gradually at 30° C. while stirring. The mixture immediately colors carmine red and the dyestuff begins to crystallize out. After about 20 minutes the mixture is diluted with 1,000 parts of water, acidified with acetic acid and the dyestuff filtered off by suction. It is thoroughly washed with dilute hydrochloric acid and water and dried. The yield is 28 to 30 parts.

The dyestuff has the following constitution:

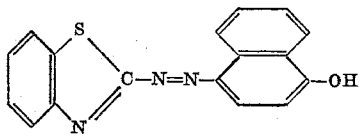

*Example 2*

21 parts of 2-hydrazino-6-nitrobenzthiazole and 15 parts of α-naphthol are dissolved in 500 parts of hot dimethyl-formamide and into the solution on the boiling waterbath there are introduced 60 parts of lead dioxide while stirring. After 20 to 30 minutes, the whole is filtered by suction while hot, the lead-containing precipitate is washed with hot dimethyl-formamide and the filtrate is stirred into 1,000 parts of 1 to 5% aqueous nitric acid. The red-brown dyestuff precipitated is filtered off by suction, washed and dried. The yield is 21.8 parts.

The dyestuff has the following constitution:

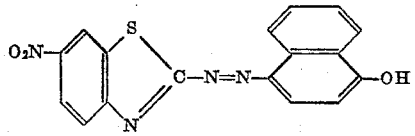

It is soluble with difficulty in methanol; the brown color of the solution changes to red-violet on the addition of ammonia solution. The dyestuff also dissolves in dilute caustic soda solution with a violet color.

*Example 3*

21 parts of 2-hydrazino-6-nitrobenzthiazole and 18 parts of 1-phenyl-3-methyl-pyrazolone-(5) diluted in dimethyl-formamide are reacted with 60 parts of lead dioxide as in Example 2. By working up, 27.5 parts of a brown-yellow dyestuff of the formula

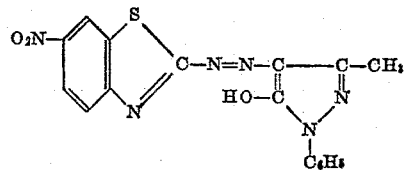

are obtained which dissolves in methanol with a golden yellow color changing to orange on the addition of ammonia.

Similar dyestuffs are obtained when using, instead of 1-phenyl-3-methyl-pyrazolone-(5), equivalent amounts of acetylacetone, malodinitrile, dimedone, barbituric acid, 8-hydroxyquinoline or acetoacetic ester.

*Example 4*

21 parts of 2-hydrazino-6-nitrobenzthiazole and 16 parts of α-naphthylamine are dissolved in 1,500 parts of 1-normal hydrochloric acid, the solution is heated to 60° C., 0.09 part of crystallized ferrous sulfate is added and 40 parts of 30% aqueous hydrogen peroxide solution is allowed to flow in gradually while stirring. The mixture immediately colors violet, and the dyestuff hydrochloride of the formula:

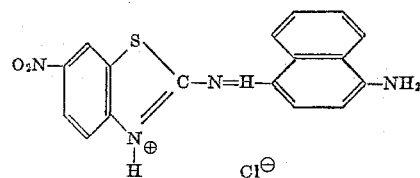

begins to crystallize out. After cooling, it is filtered off by suction and after washing and drying forms a green-brown crystal powder having a metallic lustre which dissolves in methanol with a violet color. By adding ammonia, the brown dyestuff base is precipitated. The yield of hydrochloride is 33 to 34 parts.

In an analogous manner similar dyestuffs are obtained by oxidative coupling the hydrazino compounds with the coupling compounds indicated in the following table:

| 2-hydrazino derivative of— | coupling compound | color of the dyestuff hydrochloride obtained |
|---|---|---|
| benzthiazole | α-naphthylamine | red-violet. |
| 6-methoxy benzthiazole | do | blue-violet. |
| 6-methyl benzthiazole | do | red-violet. |
| 6-cyano benzthiazole | do | Do. |
| 6-acetylamino benzthiazole | do | violet. |
| 7-methyl benzthiazole | do | Do. |
| 7-chloro-5-methyl benzthiazole | do | Do. |
| 6-methyl benzthiazole | m-toluidine | red. |
| 6-methoxy benzthiazole | do | bordo. |
| Do | N-ethyl-diphenylamine | blue. |
| 6-ethoxy benzthiazole | N-ethyl-p-ethoxy-diphenylamine | Do. |
| Do | dimethylaniline | reddish blue. |
| 6-methoxy benzthiazole | N-methyl-N-hydroxy-ethylaniline | Do. |
| 6-methyl benzthiazole | N-methyl-N-β-chlorethyl-aniline | violet. |
| 6-nitro benzthiazole | N-n-butyl-N-β-cyanoethylaniline | reddish violet. |
| 6-methoxy benzthiazole | N.N-di(hydroxyethyl)aniline | Do. |
| benzthiazole | 1.2-dimethylindole | orange. |
| 6-methoxy benzthiazole | 1-methyl-2-phenylindole | red. |

*Example 5*

22 parts of 2-hydrazino-6- acetylaminobenzthiazole and 23.5 parts of a derivative of 1-amino-5-hydroxynaphthalene of the formula:

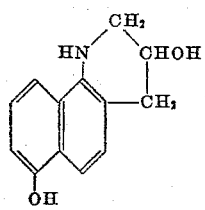

are dissolved in 1500 parts of 1-N hydrochloric acid and oxidative coupling is effected with hydrogen peroxide in the presence of ferrous sulfate as in Example 4. There are obtained 29 to 30 parts of a dyestuff hydrochloride of the formula:

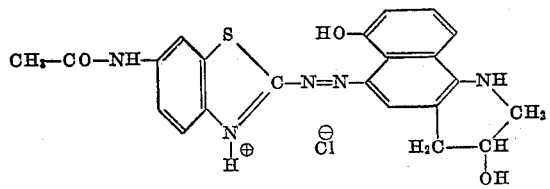

which dissolves in methanol with a green-blue color changing to violet upon the addition of caustic soda solution.

*Example 6*

18 parts of 2-hydrazino-6-aminobenzthiazole and 23.5 parts of the derivative of 1-amino-5-hydroxynaphthalene specified in Example 5 are dissolved in 1500 parts of 1-N hydrochloric acid and the mixture oxidized as in Example 4 with hydrogen peroxide in the presence of ferrous sulfate. From the resultant deep green-blue solution, the hydroiodide of the dyestuff is precipitated by the addition of a concentrated solution of 150 parts of potassium iodide. 34 to 35 parts of a dyestuff of the formula:

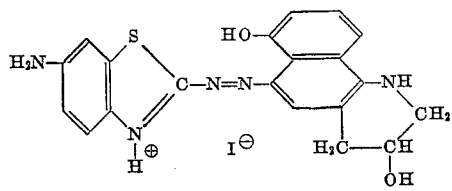

are obtained which dissolve in methanol with a green-blue color changing to violet upon the addition of caustic soda solution.

*Example 7*

14 parts of 2-hydrazinebenzoxazole are reacted as in Example 1 with 15 parts of alpha-naphthol in ammoniacal solution with the addition of potassium ferricyanide. A red-violet solution of the dyestuff of the formula

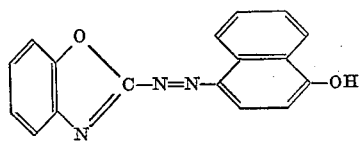

is obtained in a good yield; upon acidification with acetic acid, it changes to orange.

*Example 8*

14 parts of 2-hydrazinobenzoxazole and 16 parts of alpha-naphthylamine are dissolved in hydrochloric acid as in Example 4 and oxidized with hydrogen peroxide in the presence of ferrous sulfate to the dyestuff hydrochloride of the formula

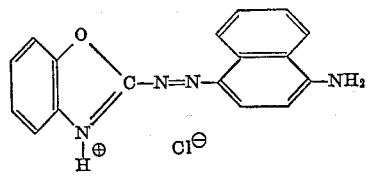

The carmine red dyestuff is obtained in a good yield.

*Example 9*

25 parts of 2-hydrazino-4-phenylthiazole and 16 parts of alpha-naphthylamine are dissolved in 1-N hydrochloric acid and oxidized as in Example 4 with hydrogen peroxide in the presence of ferrous sulfate. A blue dyestuff of the formula

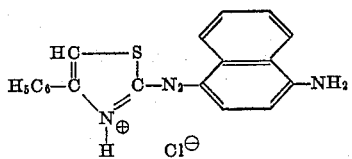

is obtained in a very good yield.

In an analogous manner similar dyestuffs are obtained by oxidative coupling the following hydrazino compounds with the indicated coupling compounds:

| 2-hydrazino derivative of— | amino compound | color of the dyestuff hydrochloride obtained |
|---|---|---|
| thiazole | α-naphthylamine | violet. |
| 3.4-diphenyl-thiazole | do | blue. |
| 3.4-dimethyl-thiazole | do | blue-violet. |
| 3.4-(1'.2'-naphthothiazole) | do | blue. |
| 3.4-(2'.1'-naphthothiazole) | do | Do. |
| thiazole | N-methyl-α-phenyl indole | red. |

*Example 10*

17.5 parts of 2-hydrazino-3,3-dimethyl indolenine and 12.1 parts of N.N-dimethyl aniline are dissolved in 1500 parts of 1-normal hydrochloric acid and treated in the manner described in Example 4 with hydrogen peroxide in the presence of ferrous sulfate. A violet dyestuff hydrochloride of the formula

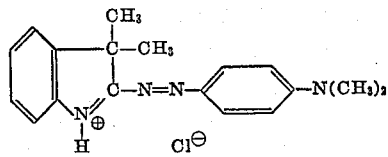

is obtained in good yields.

Similar dyestuffs are obtained in an analogous manner by oxidative coupling the following hydrazino compounds with the aromatic amines indicated:

| 2-hydrazino derivative of— | aromatic amine | color of the dyestuff hydrochloride obtained |
|---|---|---|
| 3.3-dimethyl-indolenine | N.N.-diethyl-3-cyano-aniline | blue-violet. |
| Do | N-n-butyl-N-(β-cyanoethyl)-aniline | violet. |
| Do | N.N-dimethyl-α-naphthylamine | blue. |
| 5-chloro-3.3-dimethylindolenine | N.N-diethylaniline | Do. |
| 5-bromo-3.3-dimethylindolenine | N.N-di(hydroxyethyl) aniline | Do. |
| 6-methoxy-3.3-diethyl-indolenine | N-methyl-N-hydroxyethyl aniline | violet. |
| 5-methoxy-3.3-dimethyl-indolenine | α-naphthylamine | blue. |
| 6-acetylamino-3.3-dimethyl-indolenine | do | Do. |
| 5-benzoylamino-3.3-dimethyl-indolenine | N.N-dimethylaniline | blue-violet. |
| 5-nitro-3.3-dimethyl-indolenine | do | blue. |

*Example 11*

20 parts of the dyestuff of the formula

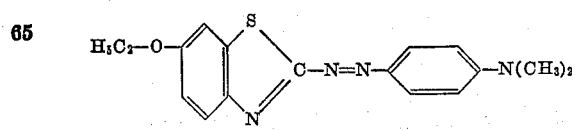

obtained by the process described in Example 4 are dissolved by heating in 300 parts of chlorobenzine. 8.7 parts of dimethylsulfate are added to this solution by portions while stirring and the solution is then heated for about 2 hours under reflux. The quarternized dyestuff is filtered off by suction, washed with benzene, dried and dissolved in hot water. By adding sodium chloride, the dyestuff of the formula

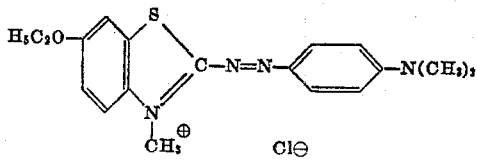

is obtained with a yield of 27 parts. It is soluble in hot water with a blue coloration which remains unchanged on adding mineral acids or sodium carbonate.

The other dyestuffs of the foregoing examples can be quarternized in the same or an analogous manner.

Example 12

100 parts of polyacrylonitrile fibres are dyed in a dye bath made up of 4000 parts of water, 0.7 part of a quarternized dyestuff obtained by the process described in Example 11, and 5 parts of 30 percent acetic acid. The fibres are entered into the dye bath at about 50° C., the dye bath then being heated to boiling in the course of about 30 minutes and kept boiling for about 90 minutes. After rinsing and drying a pure blue coloration of high intensity and levelness is obtained which is very fast to light and washing.

In an analogous manner other quarternized dyestuffs which are obtained from the dyestuffs prepared by the present process can be used for the dyeing of fibres containing polyacrylonitrile.

I claim:

1. An improved process for the production of an azo dyestuff of the general formula

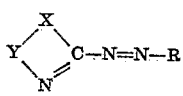

in which R represents the radical of an organic compound capable of being azo-coupled and selected from the class consisting of a phenol, a naphthol, an enol, an amino naphthol, an aromatic amine of the benzene and naphthalene series, malodinitrile and an indole, X represents a divalent bridge selected from the class consisting of —O—, —S—, —C(CH$_3$)$_2$—, and —C(C$_2$H$_5$)$_2$— bridges and Y represents a divalent radical selected from the group consisting of —CH=CH—,

—C(CH$_3$)=C(CH$_3$)—, —CH=C(C$_6$H$_5$)—

—C(C$_6$H$_5$)=C(C$_6$H$_5$)—, ortho-C$_6$H$_4$, and ortho-C$_{10}$H$_6$ radicals and their lower alkyl, chloro, nitro, lower alkoxy, cyano, amino, acetyl-amino and benzolamino derivatives, which process comprises oxidizing a mixture of about equivalent amounts of an organic compound capable of being azo-coupled and represented by the general formula H—R in which R has the same meaning as indicated above, and of a hydrazino compound of the general tautomeric formulae

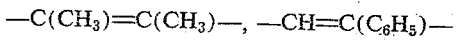

and

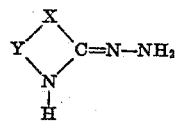

in which X and Y have the same meaning as indicated above, in an aqueous medium with a water-soluble oxidizing agent selected from the class consisting of a ferricyanide, a ferric and a cupric salt, hydrogen peroxide, a perborate and a persulfate in the presence of a ferrous salt.

2. An improved process for the production of a member of the class consisting of a basic azo dyestuff of the general formula

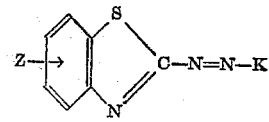

in which Z represents a member of the class consisting of hydrogen, methyl, lower alkoxy, cyano, acetylamino, nitro and chloro, and K represents the radical of an aromatic amino compound capable of being azo-coupled, and the hydrochlorides of said basic azo dyestuffs, which process consists in oxidizing an aqueous hydrochloric acid solution of about equivalent amounts of a hydrazino compound of the tautomeric general formulae

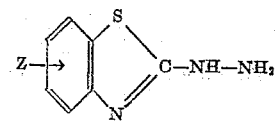

and

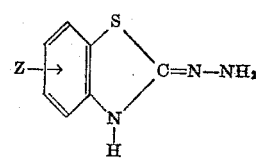

in which Z has the same meaning as indicated above and of an aromatic amino compound capable of being azo-coupled at about 60° C. with aqueous hydrogen peroxide solution in the presence of ferrous sulfate.

3. An improved process for the production of a member of the class consisting of a basic dyestuff of the general formula

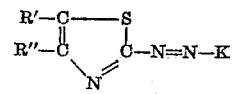

in which R' and R" each represents a member of the class consisting of hydrogen, methyl and phenyl groups and K represents the radical of an aromatic amino compound capable of being azo-coupled, and the hydrochlorides of said basic azo dyestuffs, which process consists in oxidizing an aqueous hydrochloric acid solution of about equivalent amounts of a hydrazino compound of the tautomeric general formulae

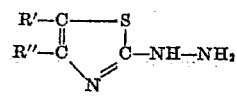

and

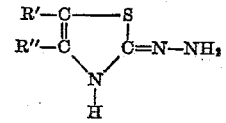

in which R' and R" have the same meaning as indicated above and of an aromatic amino compound capable of being azo-coupled at about 60° C. with aqueous hydrogen peroxide solution in the presence of ferrous sulfate.

References Cited in the file of this patent

UNITED STATES PATENTS

| | | |
|---|---|---|
| 2,149,051 | Heinrich et al. | Feb. 28, 1939 |
| 2,441,612 | Argyle et al. | May 18, 1948 |
| 2,498,418 | Hanford | Feb. 21, 1950 |

OTHER REFERENCES

Rosenhauer: Ber. Deut. Chem., vol. 57, pp. 1192–3 (1924).

Sidgwick: The Organic Chemistry of Nitrogen (1949), page 385.

UNITED STATES PATENT OFFICE
Certificate of Correction

Patent No. 2,832,764                                              April 29, 1958

Siegfried Huenig

It is hereby certified that error appears in the printed specification of the above numbered patent requiring correction and that the said Letters Patent should read as corrected below.

Column 4, lines 20 to 22 inclusive, for the central portion of the formula reading

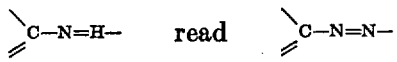

column 6, first table, under the heading "2-hydrazino derivative of—"
for 3.4-diphenyl-thiazole _____
        3.4-dimethyl-thiazole _____
        3.4-(1'.2'-naphthothiazole)_____
        3.4-(2'.1'-naphthothiazole)_____ read 4.5-diphenyl-thiazole _____
        4.5-dimethyl-thiazole _____
        4.5-(1'.2'-naphtho-)thiazole_____
        4.5-(2'.1'-naphtho-)thiazole_____

Signed and sealed this 12th day of August 1958.

[SEAL]

Attest:
KARL H. AXLINE,
*Attesting Officer.*

ROBERT C. WATSON,
*Commissioner of Patents.*